E. M. F. GUIGNARD.
CAMERA AND ATTACHMENTS THEREFOR.
APPLICATION FILED JUNE 18, 1915.

1,190,996.

Patented July 11, 1916.
3 SHEETS—SHEET 1.

Witnesses

Inventor
E.M.F. Guignard
By Victor J. Evans.
Attorney

E. M. F. GUIGNARD.
CAMERA AND ATTACHMENTS THEREFOR.
APPLICATION FILED JUNE 18, 1915.

1,190,996.

Patented July 11, 1916.
3 SHEETS—SHEET 2.

Witnesses

Inventor
E. M. F. Guignard.
By Victor J. Evans.
Attorney

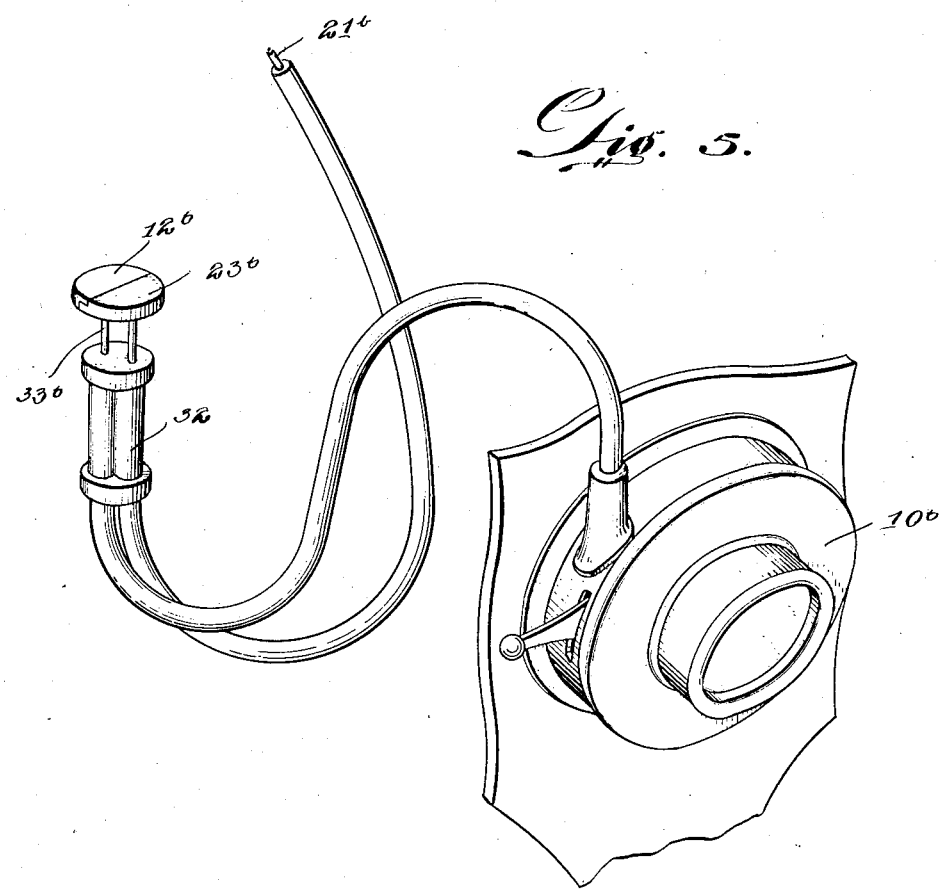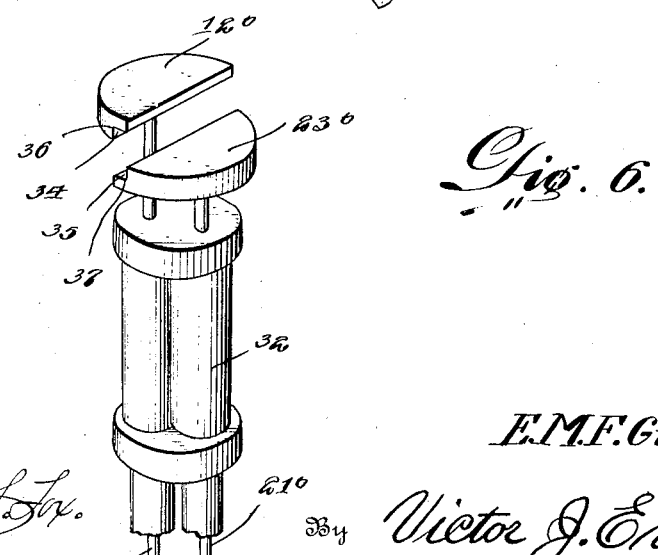

UNITED STATES PATENT OFFICE.

EDWIN M. F. GUIGNARD, OF PEKING, CHINA.

CAMERA AND ATTACHMENTS THEREFOR.

1,190,996.  Specification of Letters Patent.  Patented July 11, 1916.

Application filed June 18, 1915. Serial No. 34,954.

*To all whom it may concern:*

Be it known that I, EDWIN M. F. GUIGNARD, a Swiss, citizen of Lausanne, Switzerland, residing at Peking, in the Republic of China, have invented new and useful Improvements in Cameras and Attachments Therefor, of which the following is a specification.

The invention relates to photography, and more particularly to apparatus for use in photography, and has for an object to provide a camera arranged and constructed to prevent double exposure upon the same film or plate.

The invention contemplates, among other features, the provision of a camera, with suitable means associated with the usual shutter of the camera and with the usual film or plate mechanism to give notice to the operator that the plate or film either has been or has not been exposed so, that if the plate or film has been exposed a duplicate exposure of the same plate or film will be prevented and a new plate or film arranged in position before the next exposure.

Figure 1:
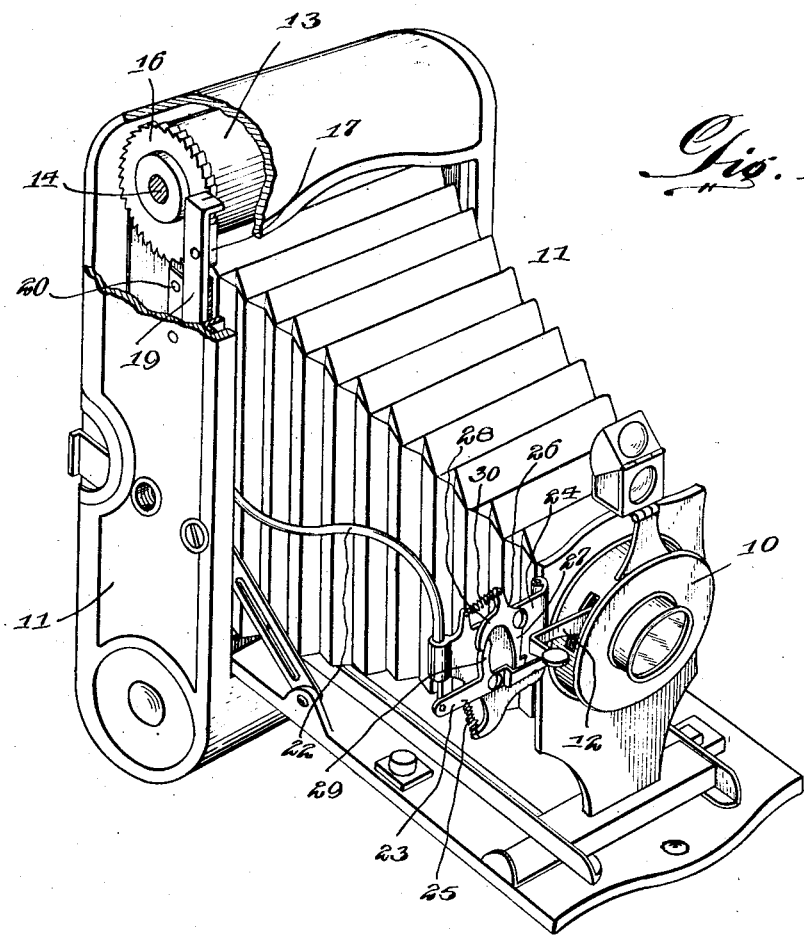
Figure 2:
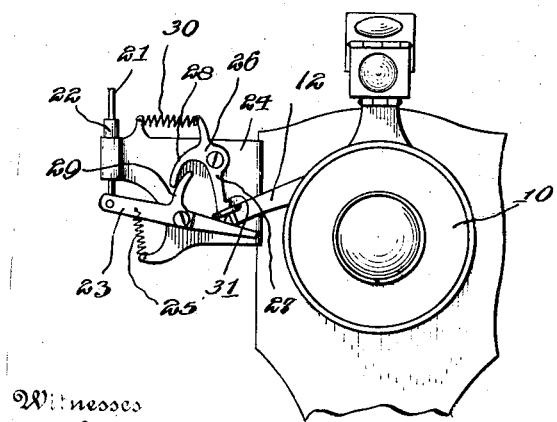
Figure 3:
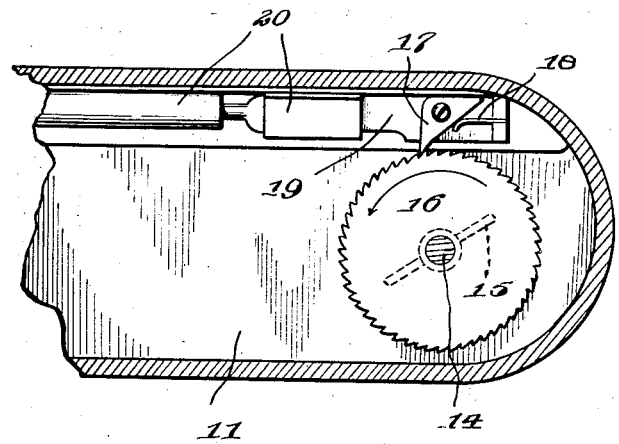
Figure 4:
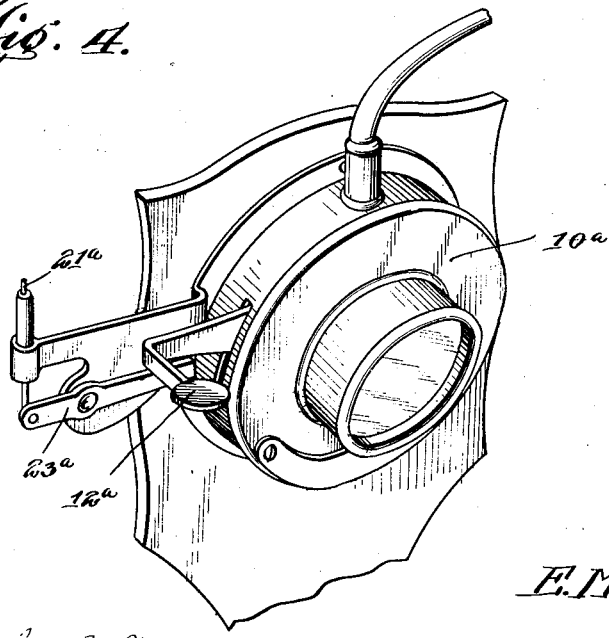

In the further disclosure of the invention reference is to be had to the accompanying drawings, constituting a part of this specification, in which similar characters of reference denote corresponding parts in all the views, and in which:

Figure 1 is a perspective view of a camera showing a form of my device applied thereto, parts being broken away to disclose the underlying structure, the apparatus being shown in initial position; Fig. 2 is a front elevation of a portion of the mechanism showing the same after it has been operated and the exposure made; Fig. 3 is a sectional view taken through a portion of the camera showing the ratchet mechanism; Fig. 4 is a perspective view of a modified form of my device; Fig. 5 is a perspective view of still another modified form, the device being shown in initial position; and Fig. 6 is a fragmentary perspective view of an operating portion of the device, showing the same in operative position.

Referring more particularly to the views, I disclose the usual shutter 10 of a camera 11, said shutter including the usual shutter lever 12, which, when operated, will result in an exposure of the usual film which has an end thereof wound around a roller 13 carried on a spindle 14 having an exterior operating knob 15. Keyed to rotate with the spindle 14 is a ratchet wheel 16, with the teeth of which a pawl 17 is adapted to coöperate, said pawl being engaged by a spring 18 to hold an end thereof in contact with the teeth of the ratchet wheel, the pawl furthermore being pivoted upon a slide 19 in a casing 20 suitably secured in the camera. A cable 21 of a flexible nature, preferably inclosed in a covering 22 also of a flexible nature has connection with the slide 19 and the other end of the cable is pivoted to one end of a link 23 mounted to swing upon a plate 24 projected to one side of the shutter, said link having its inner end connected with a contractile spring 25 secured to the plate 24, with a link 23 adjacent its inner end adapted to be engaged by the shutter lever 12 when the same is actuated.

Mounted to swing upon the plate 24 is a fork like operating element 26 which has tooth-like projections 27 adapted for locking engagement with the shutter lever 12, said element 26 also having a tongue 28 adapted to coöperate with an extension 29 on the link 23, a suitable contractile spring 30 having connection with the operating element 26 and connected to the plate 24.

Now assuming that the mechanism described is in the position shown in Fig. 1, it will be clearly seen that the projection 27 will lie outside of the path of the shutter lever 12, the camera being now in position to be operated and expose the film. The exposure is made in the ordinary way by operating the shutter lever 12 and in so doing the downward movement of the shutter lever will cause the same to engage the link 23 and operate the same against the action of the spring 25, thus swinging the outer end of the link 23 upwardly and advancing the cable 21 in its covering 22 to advance the slide 19 in the casing 20 so as to move the pawl 17 loosely over the teeth of the ratchet wheel 16. It will be seen that the operation of the link 23 results in the disengagement of the extension 29 from the tongue 28, thus permitting the spring 30 to act upon the locking element 26 and move the projection 27 into the path of the shutter lever which, upon returning to initial position after the shutter has been operated, will ride easily over the tooth-like end of the locking element until it passes a ledge 31 thereof and which ledge, coming beneath the shutter lever, will now lock therewith due to the action of the spring 30, thus holding the shutter lever in locked position. It will now be seen that the shutter lever cannot be operated until the knob 15 has been grasped and rotated to rotate the spindle 14 and likewise the roller 13 so as to advance the film upon the wind-up roller and bring a new film into position for exposure. The winding up of the film upon the roller results in the rotation of the ratchet wheel 16, the pawl 17 being in locking engagement with the teeth of the ratchet wheel causing the slide 19 which, in this instance, is in the casing 20, to move in one direction thus operating the cable 21 which will act upon the outer end of the link 23 to return the same to initial position and cause the extension 29 to engage the tongue 28 of the locking element, thus swinging the locking element against the action of its spring and moving the locking projection of said locking element out of the path and out of engagement with the shutter lever so that the shutter lever will now be free to act and can be readily operated when the subsequent exposure of the new film is to be made and which subsequent operation of the shutter lever will again operate the device in the manner mentioned so that the shutter lever, after it has been actuated, will be again locked and must of necessity bring about the advancement of the film upon the wind-up roller before the shutter lever will be again released to permit operation of the shutter.

In Fig. 4 I show a modified form of my structure and in which instance the structure is substantially the same with the exception that the locking element 26 is discarded, the shutter lever being indicated by the numeral $12^a$ and operating upon the shutter $10^a$, with the link indicated by the numeral $23^a$ and the cable by the numeral $21^a$, said cable having pivotal connection with the link as shown. Now when the shutter lever $12^a$ is operated, it, bearing against the inner end of the link $23^a$, will operate the same to move the outer end of the link upwardly, thus advancing the cable $21^a$ to operate the slide shown heretofore and indicated by the numeral 19 so as to bring the pawl 17 into locked relation with the ratchet wheel 16, as will be clearly seen. The operator, before making a subsequent exposure, will note that the inner end of the link $23^a$ is in lowered position, whereas it should normally be immediately beneath or substantially engage the shutter lever and thus will operate the film winding mechanism to advance the film in the camera before making the next exposure.

In Figs. 5 and 6 I have shown still another modified form of my invention and in which instance a more compact form of device is employed, the cable to the ratchet mechanism in this instance being indicated by the numeral $21^b$ and having its free end connected with a casing 32, said cable passing through the casing 32 and terminating in an operating member $23^b$. The operating member for the shutter indicated by the numeral $10^b$ is a cable 33 passing through the casing 32, with its outer end terminating in an operating member $12^b$ and its inner end connected with the shutter to operate the same upon pressure being applied to the operating member $12^b$. Now referring to Fig. 6 it will be seen that the operating members $12^b$ and $23^b$ are somewhat alike, being semicircular in shape, with the straight edge of the operating member $12^b$ formed with a ledge 34 and the straight edge of the operating member $23^b$ formed with an opposed ledge 35, thus providing respective grooves 36 and 37, with the ledge of one operating member lying in the groove of the other operating member when said operating members are in normal position as shown in Fig. 5. Now in operating the shutter $10^b$ pressure is applied to the operating member $12^b$, thus actuating its cable 33 to operate the shutter. At the same time and by placing the thumb or a finger against both operating members $23^b$ and $12^b$ which, when engaging the operating member $12^b$, will be locked therewith, will also be pressed downwardly so that the two operating members will move together against the casing 32, thus resulting in the operation of the cable $21^b$ to actuate the ratchet mechanism described heretofore and to move the pawl 17 into engagement with the teeth of the ratchet wheel 16. After the exposure has been made by the downward pressure of the member $12^b$ the said member $12^b$ will return to initial position but the member $23^b$ operating the cable to the ratchet mechanism will remain in its lowered position, said member $12^b$ returning to its initial position in view of the fact that the shutter lever or operating portion must naturally be returned to initial position as is the case in all shutters now generally used on cameras. Therefore, the operating member $23^b$ will remain in its lowered position and thus the operator will readily see that the film has not been advanced in the camera for the reason that when the film is advanced by winding up the film winding mechanism the pawl 17 in locked relation to the ratchet wheel 16 will result in the retraction of the slide 19 in the casing 20, thus operating upon the cable 23 and moving the operating member $23^b$ back into engagement with the operating member $12^b$, it being understood that the camera is in position for exposure, with a new film ready to be exposed when both operating members $12^b$ and $23^b$ lie in the same plane and interlock through the provision of the ledges 34 and 35 and respective grooves 36 and 37 and that when one of the operating members remains down after exposure it is an indication that the film has not been advanced in the camera and that a subsequent exposure will result in a double exposure or two exposures on the same film.

From the foregoing description it will be clearly seen that the device is provided to greatly tend to prevent double exposures upon films and that in the preferred form of the device a locked relation between the film winding mechanism and the shutter is accomplished which prevents the subsequent operation of the shutter until the film has been advanced, the modified forms of the device clearly showing structures in which the operator is put on notice that the film must be advanced before the next exposure is made for the reason that parts of these structures will not have returned to their initial positions but necessarily must be so returned when the film is advanced to bring a new film into proper position for exposure in the camera.

Having thus described my invention, I claim:

1. In a camera including a shutter lever and a film winding mechanism, a ratchet wheel movable with said film winding mechanism, a pawl for association with said ratchet wheel, a cable for moving said pawl from initial position into relation with said ratchet wheel when said shutter lever is operated whereby said cable will not be returned to initial position until said pawl is actuated by the film winding mechanism and returned to initial position after the shutter has been actuated, and a slide carrying said pawl and connected with said cable.

2. In a camera including a shutter lever and a film winding mechanism, a link operable by said shutter lever, a cable connected to said link, means adapted to be operated by said cable and associated with said film winding mechanism whereby when said shutter lever is actuated upon by said link to result in operation of said cable said means will be associated with said film winding mechanism whereby said film winding mechanism must be actuated to return said link to operative relation with said shutter lever.

In testimony whereof I affix my signature in presence of two witnesses.

EDWIN M. F. GUIGNARD.

Witnesses:
C. L. MORGAN,
W. J. CANNON.